US006195482B1

(12) United States Patent
Dragone

(10) Patent No.: US 6,195,482 B1
(45) Date of Patent: Feb. 27, 2001

(54) WAVEGUIDE GRATING ROUTER

(75) Inventor: Corrado Pietro Dragone, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,717

(22) Filed: Dec. 29, 1998

(51) Int. Cl.[7] .................................................. G02B 6/26
(52) U.S. Cl. .................................................. 385/28
(58) Field of Search .............................. 385/28, 46, 31, 385/32, 37, 47

(56) References Cited

U.S. PATENT DOCUMENTS

| 5,002,350 | 3/1991 | Dragone | 350/96.15 |
| 5,136,671 | 8/1992 | Dragone | 385/46 |

OTHER PUBLICATIONS

C. Dragone, "Efficient Techniques for Widening the Passband of a Wavelength Router,"*Journal of Lightwave Technology*, 16. No. 10, pp.1895–1906 (1998).

C. Dragone et al., "Waveguide grating router with maximally flat passband produced by spatial filtering," *Electronics Letters*, 33, No. 15, pp. 1312–1314 (1997).

C. Dragone, "An N×N Optical Multiplexer Using a Planar Arrangement of Two Star Couplers," *IEEE Photonics Technology Letters*, 3, No. 9, pp. 812–814 (1991).

Primary Examiner—Frank G. Font
Assistant Examiner—Tu T. Nguyen
(74) Attorney, Agent, or Firm—J. J. Brosemer

(57) ABSTRACT

A waveguide grating router having an improved passband flatness with lower loss is provided that includes a first optical coupling device having at least one input port, at least one mode converter, and P output ports, where P>2. A second optical coupling device is also provided that has P input ports, least one output port, and at least one mode converter. P optical paths couple the input port of the first optical coupling device to the output port of the second optical coupling device. The mode converters control the magnitudes of various transmission coefficients contributed by the optical paths of the router. The phases of the various contributions are determined by the optical path lengths, and these lengths are chosen so that certain contributions are opposite to other contributions.

4 Claims, 15 Drawing Sheets

MULTIMODING SECTION

APPROXIMATE RELATIONS:

$\rho_0/\rho_2 \cong 0.446$ $\rho_1/\rho_2 \cong 0.57$ $\dfrac{\rho_2^2}{\lambda L} \cong 0.746$ $\dfrac{L^2}{\lambda R} \cong 0.857$

FOR THE EXAMPLE OF FIG. 6

$n_1 = 1.4457$ $n_2 = n_1 + \Delta n$ $\Delta n/n_1 = 0.0047$ $\rho_2 = 14 \mu m$

MULTIMODING SECTION
(UNIFORM WIDTH)

EXAMPLES ($n = 1.4457$, $\frac{\Delta n}{n} = 0.0047$)

A) $P_1 = 10.0 \mu m$, $P_2 = 17.7 \mu m$, $L = 320 \mu m$,

B) $P_1 = 8.0 \mu m$, $P_2 = 15.0 \mu m$, $L = 245 \mu m$,

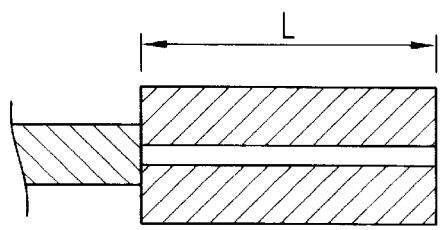
FIG. 15A
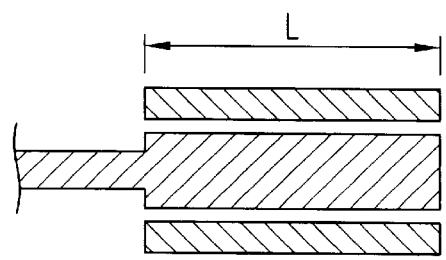
FIG. 15B
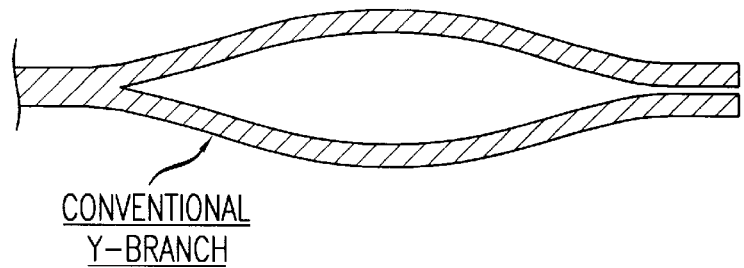
FIG. 15C
CONVENTIONAL Y-BRANCH
FIG. 16
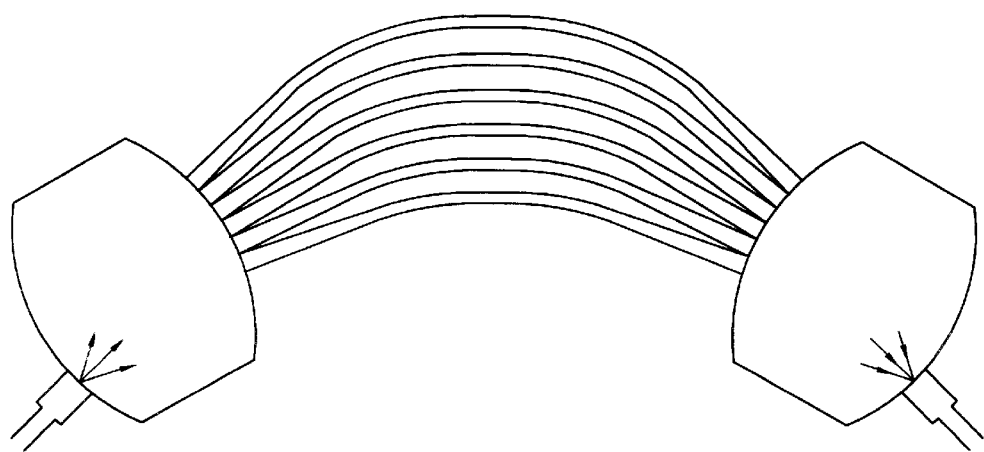

POWER $P_s$ RECEIVED BY s-th ARMS IS REDUCED BY DECREASING WIDTH OF s-th RECEIVING APERTURE, AND INCLUDING GAP.

WAVEGUIDE GRATING ROUTER

FIELD OF THE INVETION

The present invention relates generally to the field of optical interconnection and communications and in particular to an improved waveguide grating router.

BACKGROUND OF THE INVETION

Optical switching, multiplexing, and demultiplexing has been accomplished in the past by using an interconnection apparatus having a number of closely spaced input waveguides communicating with the input of a star coupler. The output of the star coupler communicates with an optical grating having a series of optical waveguides, each of these waveguides differing in length with respect to its nearest neighbor by a predetermined fixed amount. The grating is further connected to the input of a second star coupler, the outputs of which form the outputs of the switching, multiplexing, and demultiplexing apparatus.

An example of such an interconnection apparatus is disclosed in U.S. Pat. Nos. 5,002,350 and 5,136,671. The geometry of such an apparatus may be such that a number of separate and distinct wavelengths each launched into a separate and distinct input port of the apparatus will all combine and appear on a predetermined one of the output ports. In this manner, the apparatus performs a multiplexing flnction and may advantageously also perform a demultiplexing function. In this demultiplexing situation, a plurality of input wavelengths is directed to a predetermined one of the input ports of the apparatus. Each of the input wavelengths is separated from the others and directed to a predetermined one of the output ports of the apparatus. Advantageously, an appropriate selection of input wavelength permits switching between any selected input port to any selected output port. Accordingly, these devices are referred to as frequency routing devices and alternative approaches to their design is desired.

SUMMARY OF THE INVENTION

I have developed a waveguide grating router incorporating a mode converter that exhibits an improved passband flatness, lower loss and crosstalk and an increased tolerance to fabrication error. The waveguide grating router includes a first optical coupler having at least one input port, at least one mode converter, and P output ports, where P>2. A second optical coupler is also provided that has P input ports, least one output port, and at least one mode converter. P optical paths couple the input port of the first optical coupler to the output port of the second optical coupler.

The waveguide grating router uses suitable input and output transformers to control the magnitudes of the various transmission coefficients contributed by the arms of the router. The phases of the arms, and their lengths are appropriately chosen so that some of the contributions are opposite to remaining contributions, resulting in specified passband behaviour.

Further features and advantages of the present invention, as well as the structure and operation of various embodiments of the present invention are described in detail below with reference to the accompanying drawing.

BRIEF DESCRIPTION OF THE DRAWING

FIG. 15 is a schematic of a mode converter including several waveguides;

FIG. 16 is a schematic of a waveguide grating router having both input and output mode converters.

DETAILED DESCRIPTION OF THE INVENTION

Figure 1:
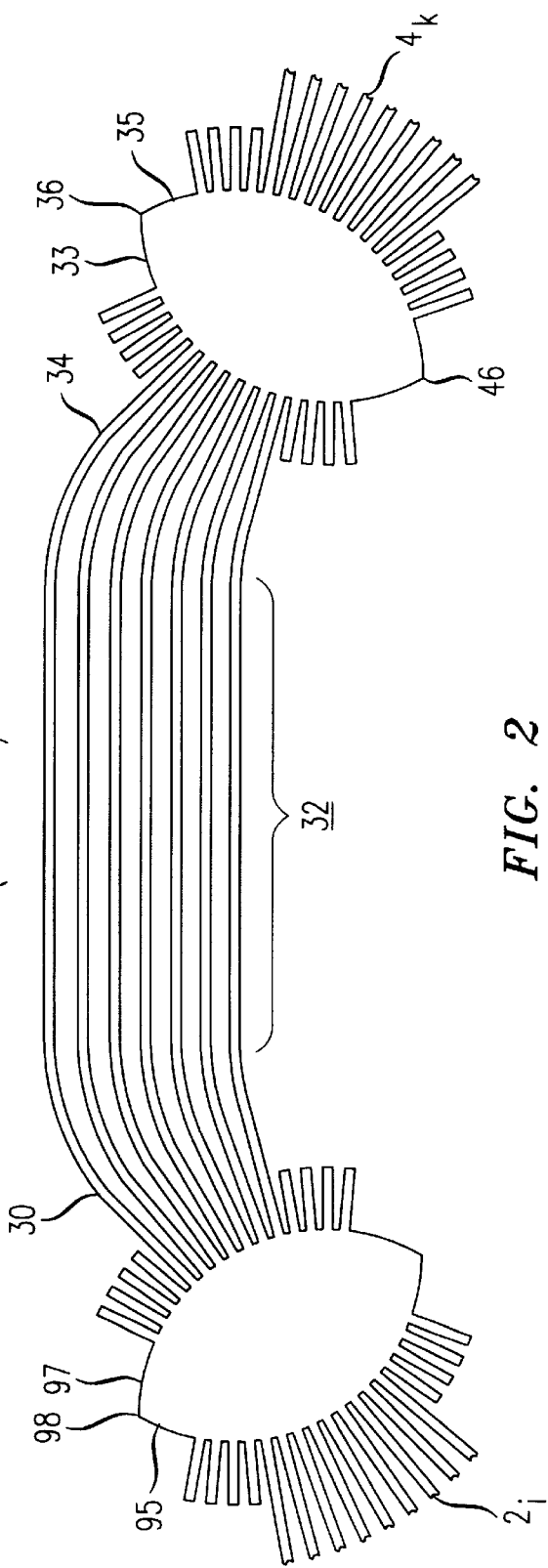
FIG. 1 illustrates an example of a prior art optical frequency routing device.
Figure 2:
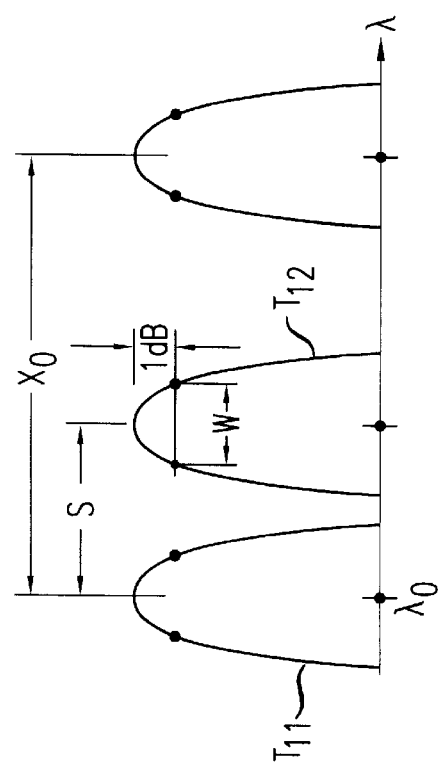
FIG. 2 is a graph showing the transmission coefficients $T_{ik}$ for the prior art routing device of FIG. 1.

By way of further background, prior art wavelength routers such as that shown in FIG. 1., can be viewed as a generalized Mach-Zehender arrangement including many "arms", each contributing to the total transmission coefficient between two particular ports. Specifically, a conventional routing device contains a plurality of input ports $2_i$, i=1,2, ..., N connected to the input circle 95 of a free space region 98. A plurality of output ports 30 extends from the output circle 97 of the free space region 98 and is connected to an optical grating 32. The optical grating 32 comprises a plurality of unequal length waveguides 34 connected to the input circle 33 of another free space region 46. The output circle 35 of the free space region 46 is connected to a plurality of output ports $4^k$, k=1,2, ..., N. Typically, the various input and output ports are formed from waveguides. These frequency routing devices operate as multiplexers and demultiplexers of optical frequencies. For example and with reference to FIG. 2, if a signal of amplitude A is applied to input port $2_1$, then signals of amplitudes $AT_{11}$, $AT_{12}$, ... $AT_{1N}$ are produced at the output ports where $T_{ik}$ is the value of the transmission coefficient for input port $2_i$ and output port $4^k$. Additional details concerning these routing devices are found in the above-referenced patents which are incorporated herein by reference.

Important properties of a wavelength router are described in an article by C.Dragone entitled "Efficient Techniques for Widening the Passband of a Wavelength Router" which appeared in the Journal of Lightwave Technology, Vol 16, No. 10, pp. 1895–1906, published in October 1998. The router transmission coefficient, which is often referred to as the transfer finction, is a superposition of the contributions from the various arms of the router. For a symmetric arrangement as described in an article entitled "An N×N Optical Multiplexer Using a Planar Arrangement of Two Star Couplers", that appeared in IEEE Photon. Technol. Lett., vol. 3, no. 9, pp. 812–815, September 1991, each contribution is determined by the power transferred to a particular arm. Then, the transfer function is the finite Fourier transform of a set of positive coefficients, each determined by the power in a particular arm. On the other hand, the transfer function can be improved by modifying the arms, so as to change their coefficients. A rectangular finction described in "Waveguide grating router with maximally flat passband produced by spatial filtering", authored by C.Dragone, et al that appeared in Electron. Lett., vol. 33, no. 15, pp. 1312–1314 in July 1997 and produced by changing the length of some of the arms by $\lambda/2$, thus changing the sign of the coefficients of these arms. The transfer function given by the Fourier transform of the coefficients is then affected by sidelobes which were reduced in the above reference by substantially reducing the powers in some of the arms. This reduction was realized without modifying the input and output waveguides, and as a consequence, substantial loss had to be introduced in the arms. Here, we describe a more efficient technique that reduces the above loss and improves the transfer function behavior.

The basic idea can be summarized as follows. In principle, any desired behavior can be realized for the transfer function. Once the transfer function is specified, the required coefficients that must be realized by the arms can be calculated by a well known method, namely by calculating the inverse Fourier transform of the transfer function. Once the coefficients are known, their appropriate phases can be produced by properly choosing the lengths of the arms. The appropriate magnitudes, however, are not so easily produced. Their values are determined by the radiation pattern of the input and output waveguides, and there is no known technique that will exactly produce the specified pattern in the vicinity of its zeroes (or its minima) with negligible loss. On the other hand, I have discovered that the pattern envelope determined by the pattern behaviour in the vicinity of its maxima can be realized by a technique, involving suitable transformers connected to the input and output waveguides as described herein. Some loss is then needed in the arms to produce the specified behaviour in the vicinity of the zeroes, but the required loss is found to be appreciably smaller than the loss required by the prior art. Therefore, by my new technique, any realistic behaviour for the transmission coefficient may be accurately realized, with negligible sidelobes. A router may then be constructed using similar transformers for the input and outputs. Therefore, consideration will be restricted to the radiation characteristics of the input transformer, since the same considerations apply (by reversing transmission) to the output transformer.

Figure 6:
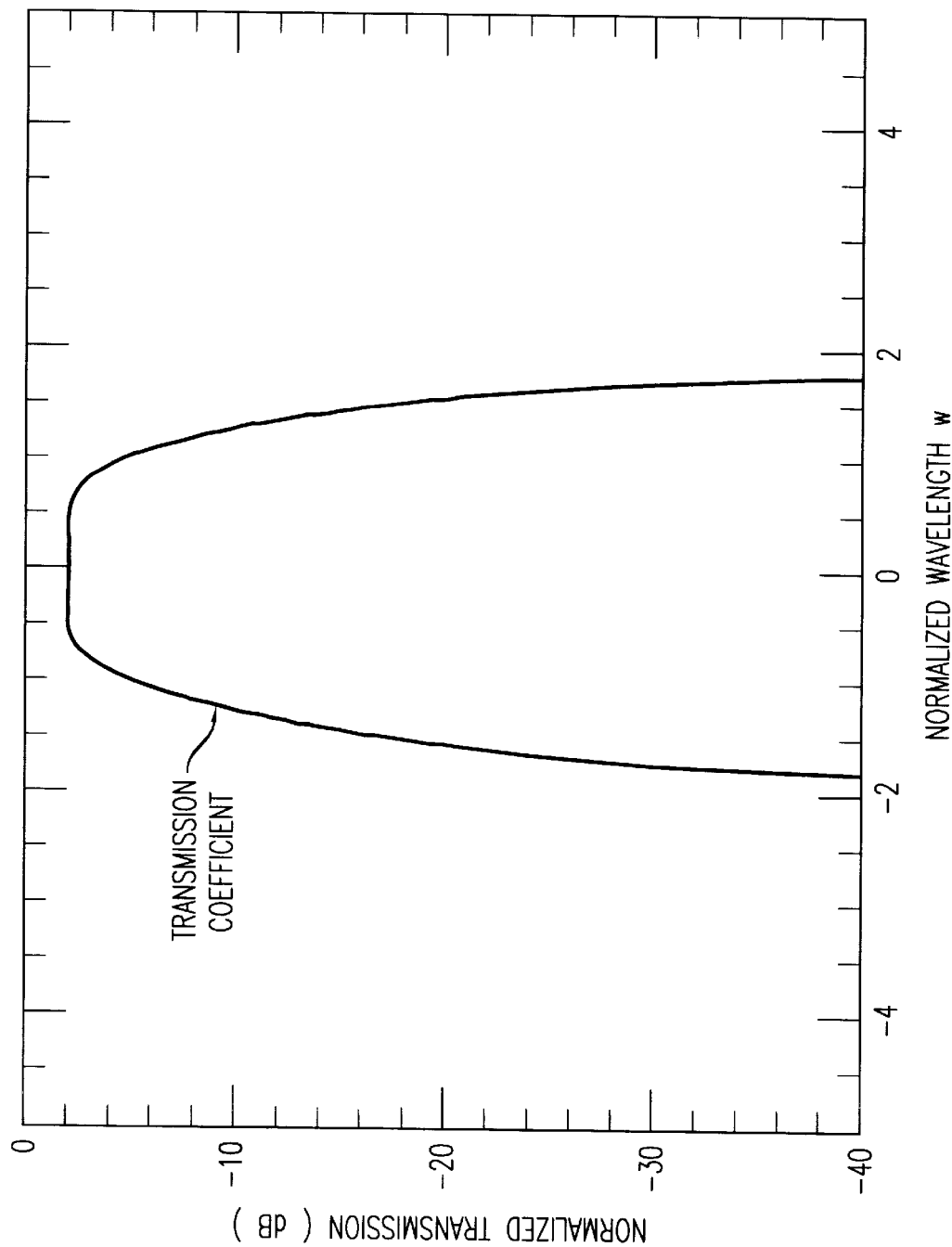
FIG. 6 is a graph of a specified transmission coefficient with maximally flat passband and negligible sidelobes.
Figure 7:
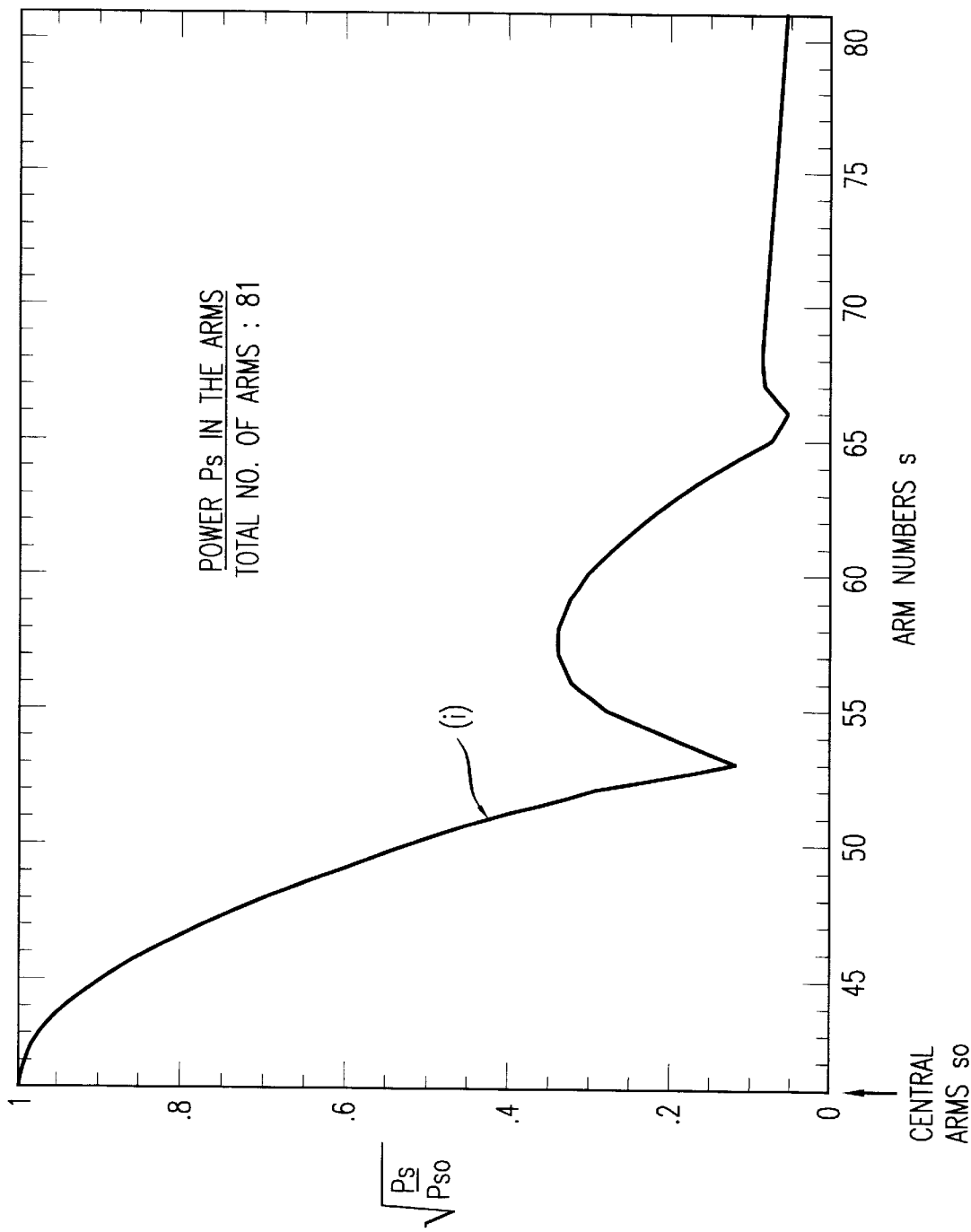
FIG. 7 is a graph showing the required power within the arms of a router in order to produce the transmission coefficient of FIG. 6.
Figure 8:
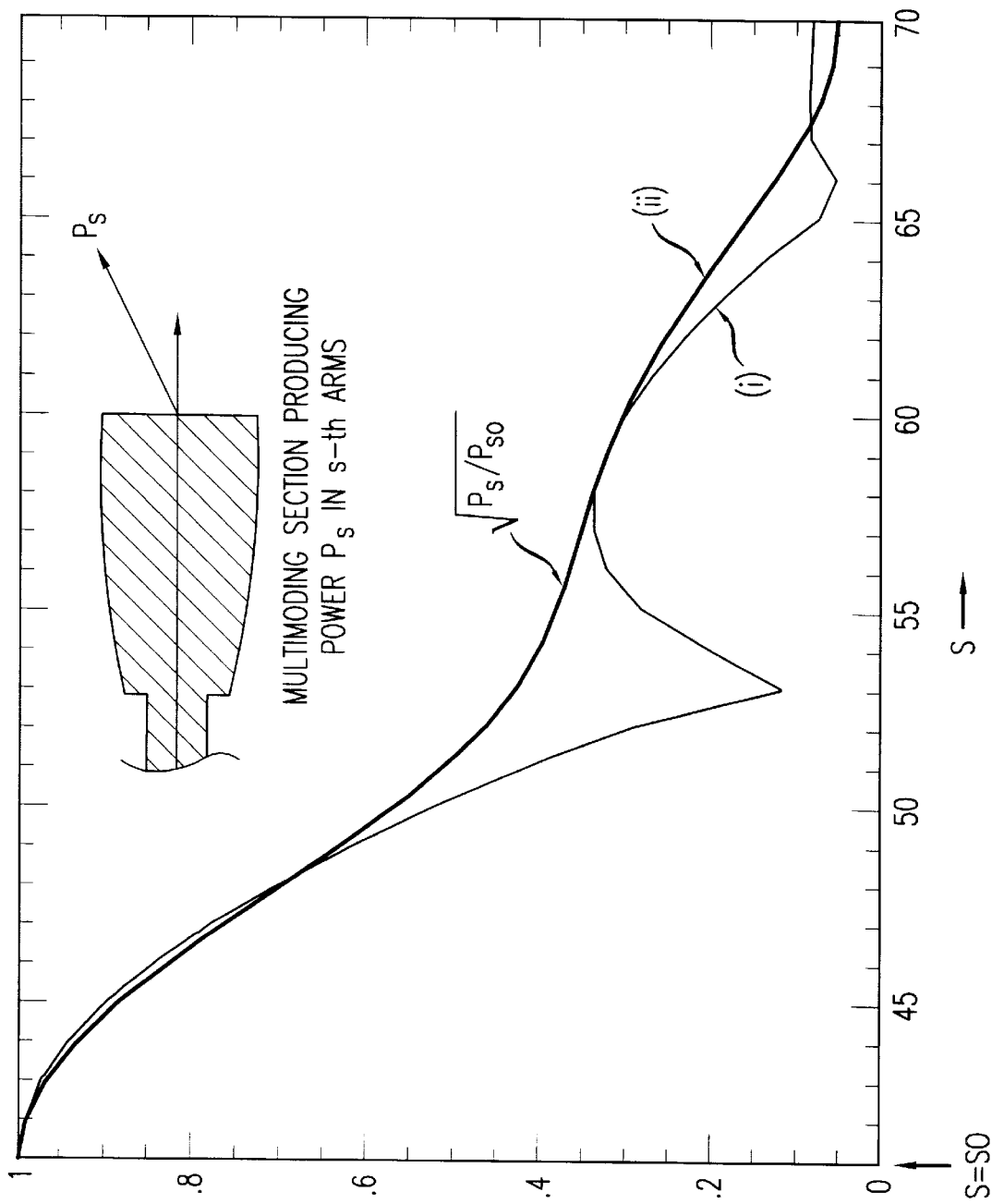
FIG. 8 is a graph and schematic of a mode converter for producing the distribution shown in FIG. 7.

In a conventional router, the input radiation pattern is produced by the fundamental mode of the input waveguide. As a result, the radiation pattern is approximately a Gaussian function which monotonically decreases on either side of the peak as shown by curve (i) of FIG. 3. Instead, in order to obtain approximately a rectangular transfer function as illustrated in FIG. 6., one must ideally produce a radiation pattern with two additional maxima, so that a minimum close to zero is produced on either side of the central peak shown in FIG. 7. Thus, here we modify the radiation pattern by exciting, in addition to the fundamental mode, of order one, the next even mode, of order 3. By then properly controlling the amplitude and phase of the additional mode, one can closely match the desired pattern behaviour in the vicinity of its peaks, as shown by curve (ii) of FIG. 8. In this example, the input waveguide is assumed to have a large V-number and the additional mode has its phase in quadrature with respect to the fundamental mode. Moreover, the additional mode power is about two tenths of that of the fundamental mode. Notice the new radiation pattern matches the specified pattern everywhere except in the vicinity of the minimum (on either side of the main lobe) of the desired pattern. However, a good match in this region is readily obtained by introducing a suitable loss in the arms of the router. One can verify that the required loss is small, roughly a few tenths of a dB, whereas about 1.5 dB loss would be required using prior art techniques. By optimizing that loss, and properly choosing the length of the arms, the radiation pattern of FIG. 8 is obtained. One can show that the minimum loss is 1.8 dB, including the loss introduced in the arms. On the other hand, by using the previous technique, the loss would be about twice that value.

As pointed out earlier, the total transmission coefficient is the Fourier transform of the transmission coefficients corresponding to the individual arms. In a conventional router, these coefficients (called the aperture coefficients) simply represent the powers produced in the arms. See, e.g., C. Dragone, "An N×N Optical Multiplexer Using a Planar Arrangement of Two Star Couplers", IEEE Photon. Technol. Lett., 3, pp. 812–815, September 1991.

Figure 3A:
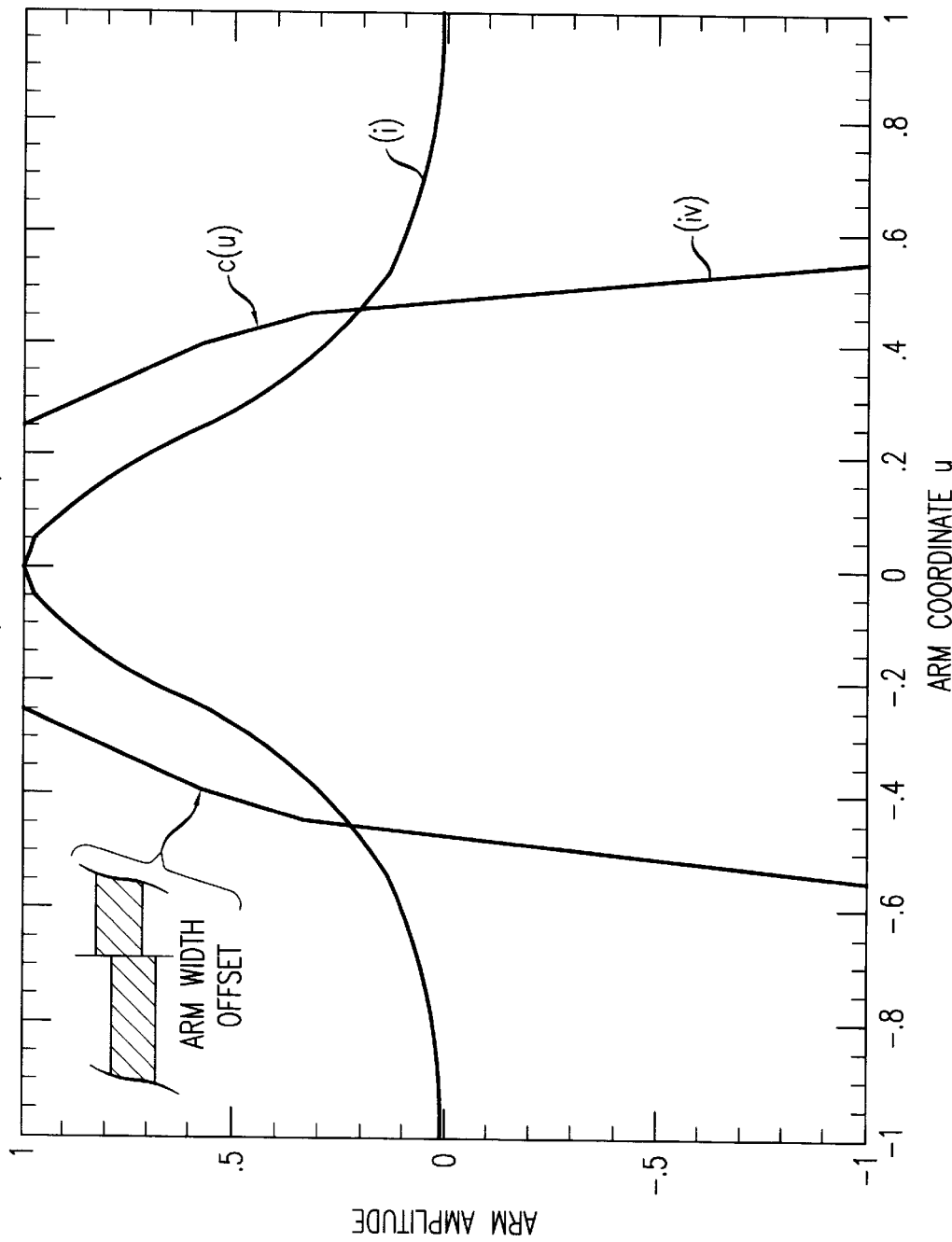
FIG. 3A is a graph showing an aperture distribution produced by a conventional router using input and output waveguides having a V-number, V=1.42.
Figure 3B:
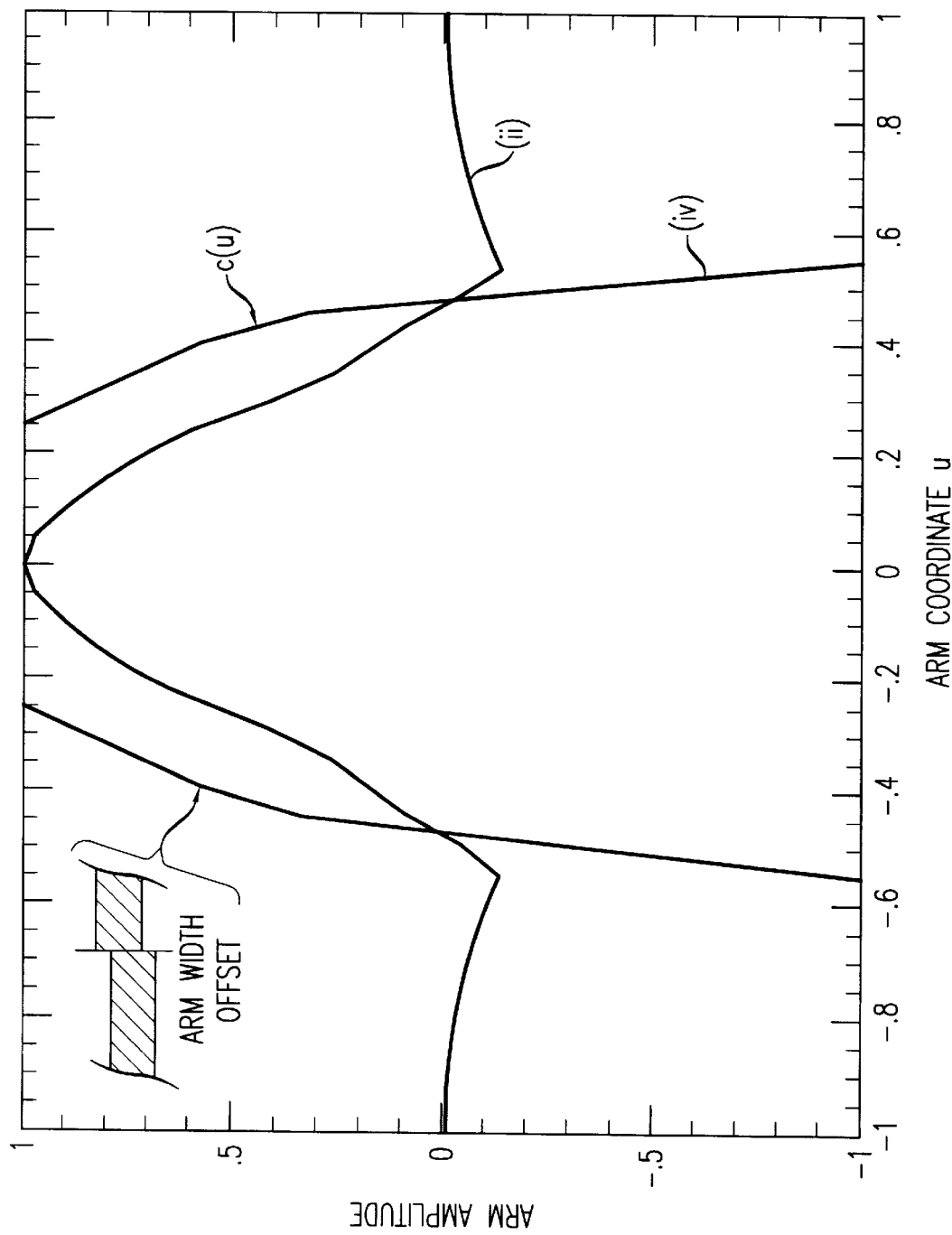
FIG. 3B is a graph showing a filtered distribution or a router having a total number of arms 2M+1 and an aperture coordinate u=j/M as determined by an arm index j.
Figure 4:
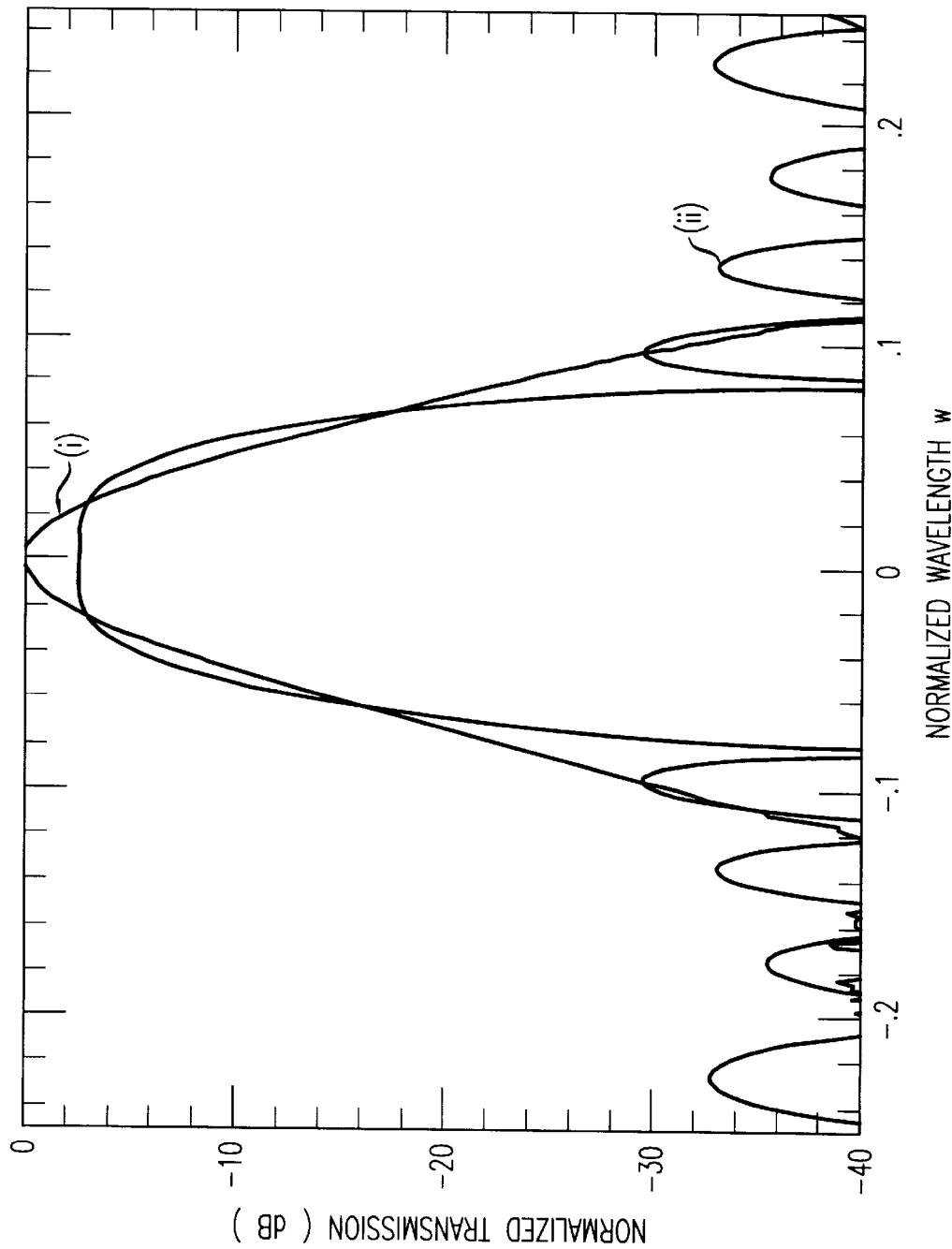
FIG. 4 is a graph showing a measured transmission coefficient obtained with filtering (ii) as compared with a measured transmission coefficient obtained without filtering (i)

Further, these coefficients approximately exhibit a Gaussian distribution, and a similar distribution is obtained for the total transmission coefficient (the Fourier transform) as shown in FIGS. 3 and 4. With continued reference to these figures, shown therein are the results obtained by aperture filtering. By this technique (aperture filtering), the aperture coefficients given in FIG. 3 by curve (i) are multiplied by the filter coefficients given by curve (iv), characterized by two zeroes. The result so obtained is a filtered distribution (ii) with two negative lobes as shown in FIG. 3. The Fourier transform then has a maximally flat passband, whose measured behaviour (ii) is compared in FIG. 4 with the behaviour (i) obtained without filtering.

Figure 5:
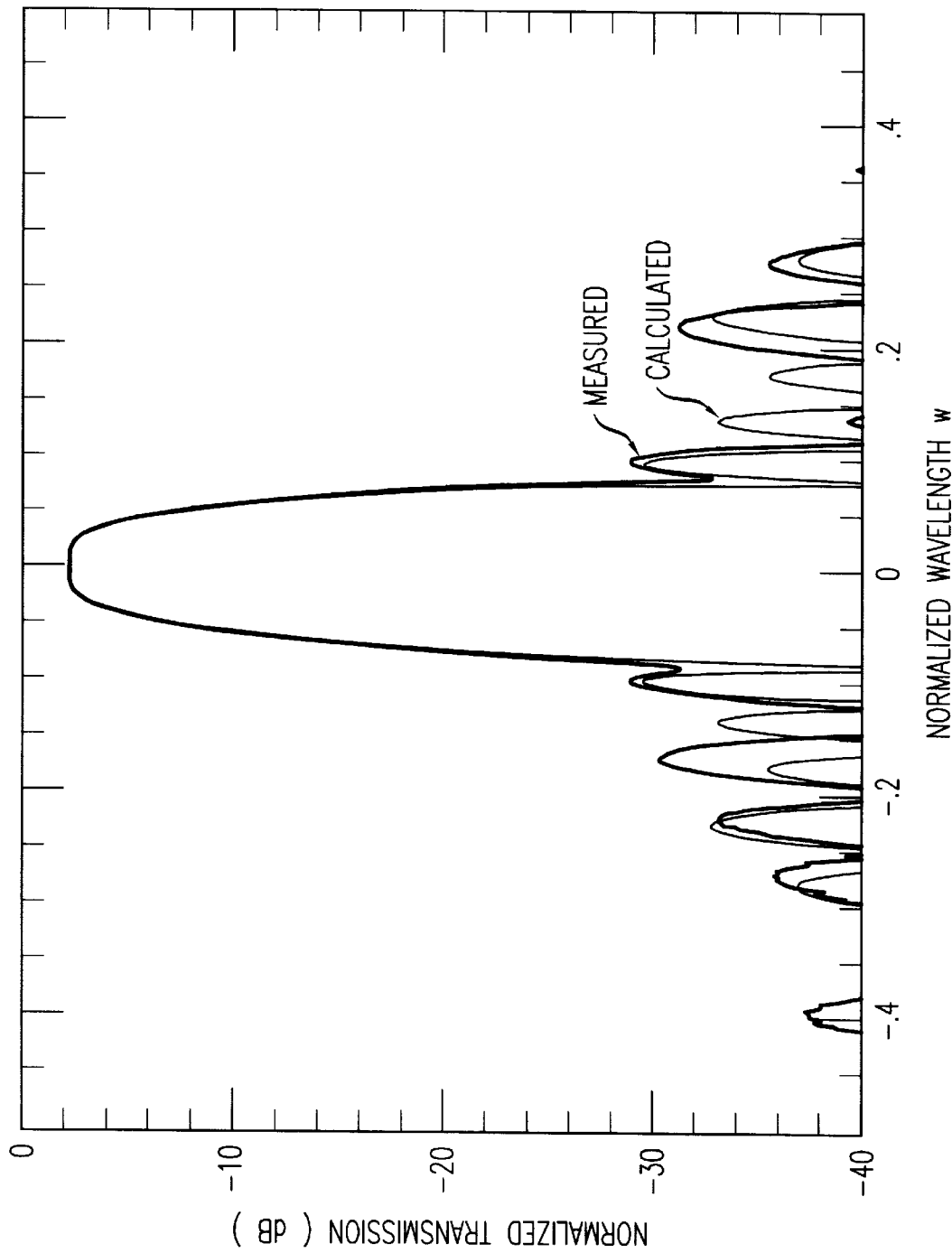
FIG. 5 is a graph showing both measured and calculated transmission coefficients.

Without filtering, the transmission coefficient has approximately Gaussian behaviour with negligible sidelobes as shown by curve (i). Filtering, increases by 2.5 dB the loss at the center of the passband, and produces sidelobes of −27 dB. On the other hand, filtering reduces the maximum loss at the passband edges, and also reduces the transition regions between passband and stopbands, located 27 dB below the peak. As shown in FIG. 5, the measurements agree well with the calculated coefficient, obtained by convolving the Fourier transform of the filter coefficients given by curve (iv) with the transmission coefficient obtained without filtering (curve (i) of FIG. 4).

In the above example, the input waveguide V-number (normalized width) is 1.45, the total number of arms is 2M+1=41, the total number of channels is 8, the free-spectral range $\lambda_f$=12.8 nm, the center wavelength $\lambda_o$=1550 nm, and the total measured loss at this wavelength, from input to output fiber, is 3.4 dB, plus the loss of 2.5 dB caused by filtering. Note that in FIG. 1 the aperture coordinate u=j/M is determined by the arm index. j=−M, ..., M.

The filter coefficients c(u) are realized as follows. Specifically, c(u) is expressed as a product of its magnitude |c(u)| multiplied by its sign sig(u). The sign distribution, responsible for the negative lobes of the filtered distribution, is produced by changing by λ/2 the length of the arms characterized by sig(u)=1. The magnitude distribution |c(u)| is produced by adding some loss in the arms close to the two discontinuities of sig(u). Without this loss, similar discontinuities would be produced in the distribution (b), and the Fourier transform would result in relatively high sidelobes. A finite loss is therefore required, in order to insure a well behaved variation in the vicinity of the two zeroes of c(u), so as to realize the specified level of −27 dB for the sidelobes. This loss is only needed in some of the arms, however, and in particular those characterized by |c(u)|<1. Importantly, it was discovered that by cutting each arm in two (along the router axis) and joining the two parts with a lateral offset, the total loss caused by c(u)<1 was close to 1.0 dB. The remaining loss, caused by sig(u), was 1.7 dB, contributing to a total of less than 3.0 dB.

The above described technique, however, still has several undesirable features. In particular, the use of conventional input and output waveguides is inefficient as it requires additional loss in the arms. This loss can be large—more than 1.5 dB, if very low side-lobes are required, or a large ratio of passband width to channel spacing is specified. Another undesirable feature is that radiation by the arms implies, by reciprocity, that unwanted signals may leak into the arms. These unwanted signals are always present in the arms vicinity, because of stray light caused by radiation modes. As those skilled in the art will appreciate, once unwanted signals leak into the arms, crosstalk results.

As can be further appreciated by those skilled in the art, loss must be introduced in the arms to reduce their coefficients. Unfortunately, when using conventional input and output waveguides, the required loss becomes much too large if the ratio of passband width to channel spacing exceeds about 0.72. As noted previously, "lossy" arms are undesirable, not only because of reduced efficiency, but also because of increased crosstalk.

It is desirable to produce a router exhibiting a maximally flat response with negligible sidelobes as shown for instance in FIG. 6. This ideally requires, for the powers in the arms, the aperture distribution (i) as depicted in FIG. 7.

Advantageously, I have found that if the input and output waveguide is modified and includes a "multimoding" section, desirable properties result. Advantageously, the addition of the multimoding section results in higher order modes, of appropriate amplitudes and phases, which approximate the envelope (ii) of the distribution (i) as shown in FIG. 8.

Figure 9:
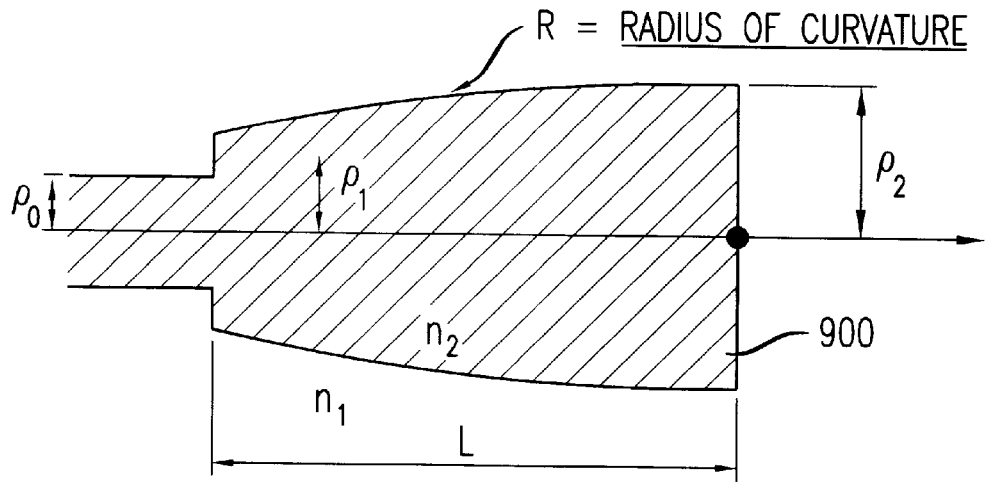
FIG. 9 is a schematic of an exemplary mode converter section according to the present invention.

With reference now to FIG. 9, there is shown a cross-sectional view of a representative multimoding section having a non-uniform width. Specifically, and with reference now to that FIG. 9, curved multimoding section 900 is shown having a radius of curvature R, a first input/output radius $\rho_0$, an internal radius $\rho_1$, and a second input/output radius $\rho_2$. The length of an internal region of the multimoding section is shown as L and the refractive index of the multimoding section is depicted as $n_2$ with the external index of refraction depicted as $n_1$.

Shown further in FIG. 9 are the approximate relations for the above variables. In particular, $\rho_0/\rho_2 \cong 0.446$; $\rho_1/\rho_2 \cong 0.57$;

$$\frac{\rho_2^2}{\lambda L} \cong 0.746;$$

and $$\frac{L^2}{\lambda R} \cong 0.857.$$

If a mode converter such as the one shown in this Figure is constructed according to these relations, the envelope of FIG. 8 is obtained. For this example, $n_1$=1.4457; $n_2$=$n_1$+Δn; Δn/$n_1$=0.0047; and $p_2$=14 μm.

Figure 10:
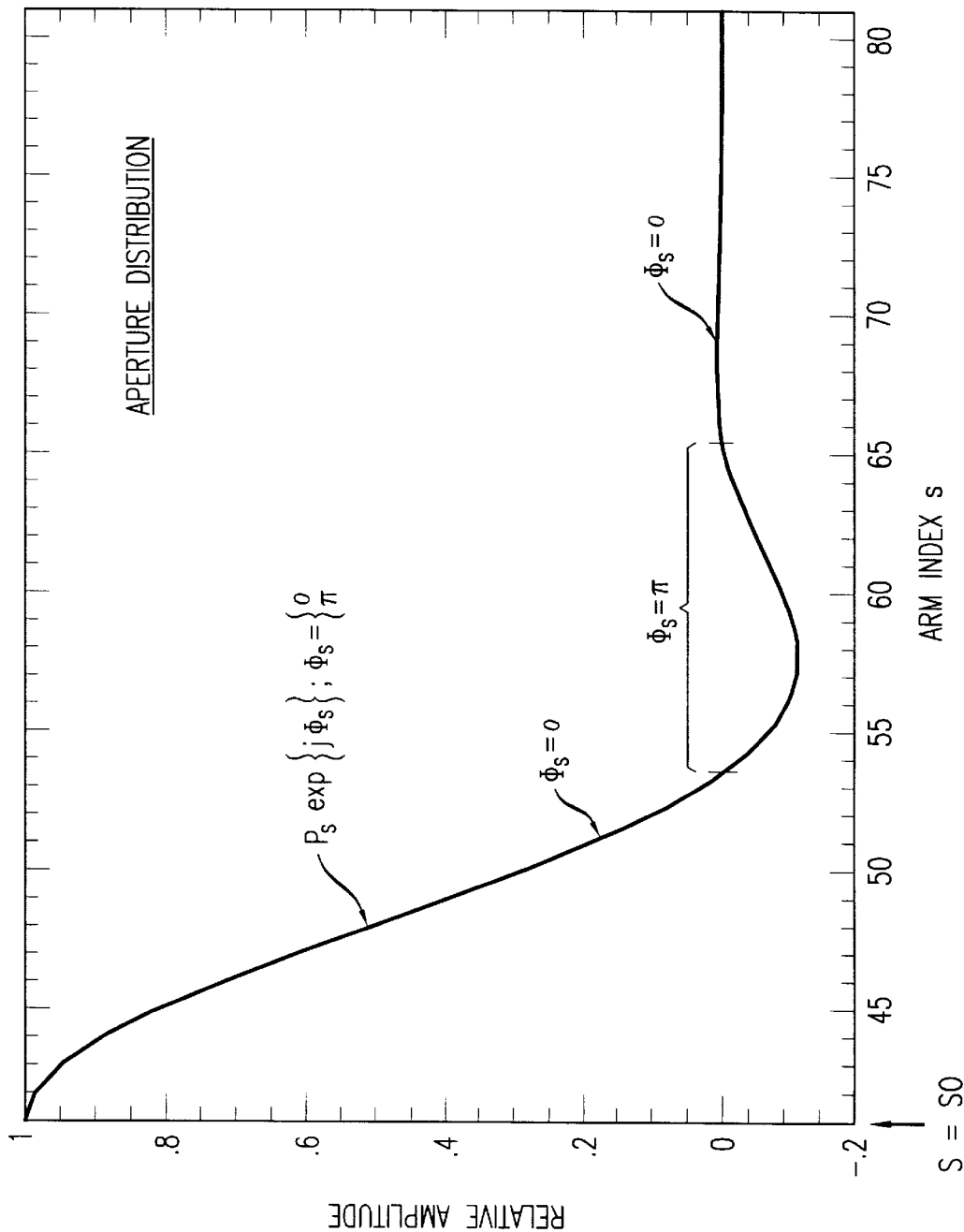
FIG. 10 is a graph of a distribution produced for aperture coefficients of a waveguide router produced using the mode converter of FIG. 9.

Once the desired envelope is obtained by properly optimizing the mode converter dimensions, some loss must be included in the arms, in order to accurately produce the specified distribution (i) of FIG. 8. One can verify that the required total loss in this example is small, about 0.6 dB. By then appropriately choosing the lengths of the arms, so as to produce the appropriate phase distribution, the aperture distribution of FIG. 10 is obtained.

Figure 11:
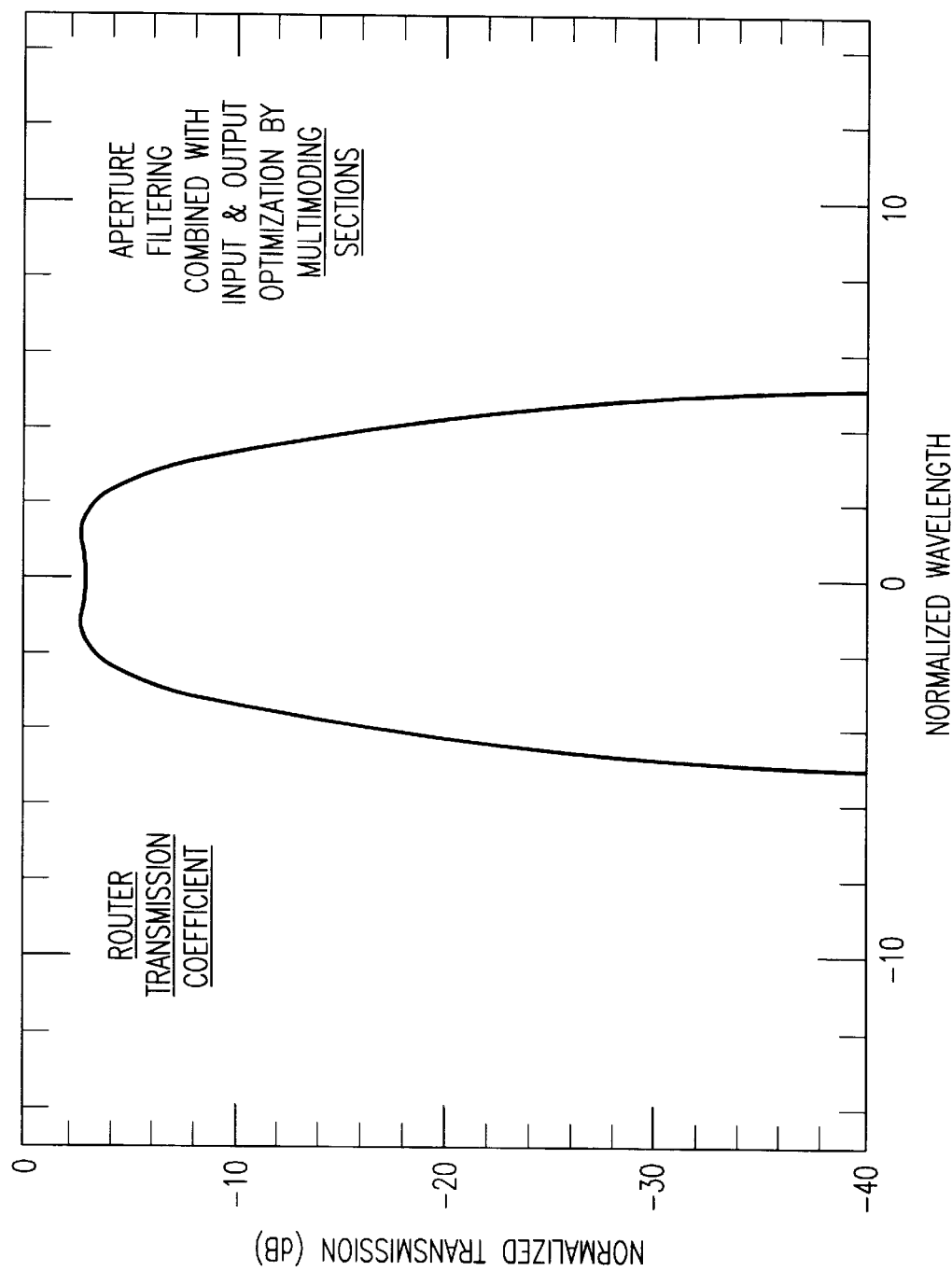
FIG. 11 is a graph of the transmission coefficient produced by the aperture distribution of FIG. 10.

The resulting transmission coefficient, shown in FIG. 11, is very close to the ideal coefficient shown FIG. 6. Advantageously, the total loss is only 0.7 db higher than the ideal loss in FIG. 6.

Figure 12:
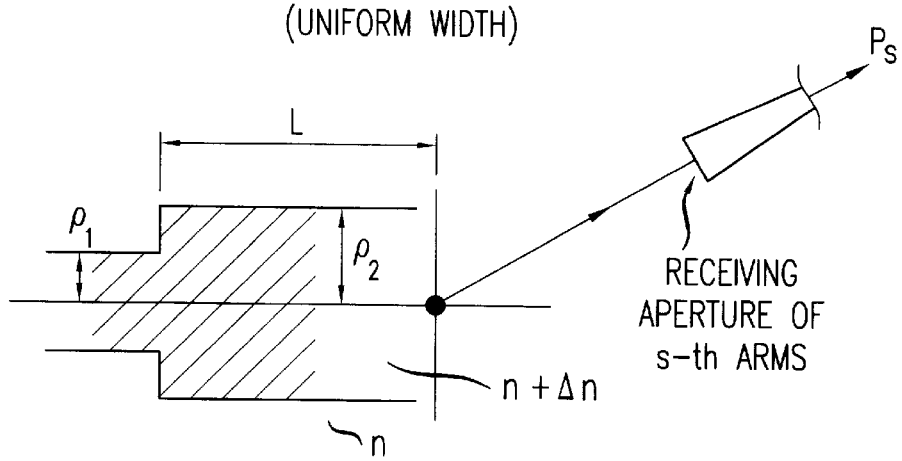
FIG. 12 is a schematic of a mode converter having an input waveguide connected to a multimoding waveguide of constant width.

With these teachings in place, those skilled in the art will now quickly appreciate that many variations to the multimoding section are readily constructed. In particular, a configuration such as that shown in FIG. 12 is constructed by directly connecting an input waveguide to a multimoding waveguide having a constant width. Specifically, and as shown as cross-section in the Figure, useful relations for this configuration include where n.=1.4457; Δn/n=0.0047: A)$\rho_1$= 10.0 μm; $p_2$=17.7 μm; and L=320 μm; and B) $\rho_1$=8.0 μm; $\rho_2$=15.0 μm; and L=245 μm.

At the junction, the input mode is transformed into a combination of modes. Important modes for our purposes are the first two even modes, as they determine the central region of the distribution (i). Also important, in general, is the third even mode, for it affects the tails of the distribution (i) (See FIG. 8). The amplitudes of these modes are determined by the widths $\rho_0,\rho_2$ of the two waveguides at the junction. Their relative phases are determined by the differential propagation constants and the total length of the multimoding section. Thus, the appropriate amplitudes and phases at the converter aperture are obtained by optimizing the width and length of the converter.

When the dimensions previously described and shown in FIG. 9 are used to construct a multimode section, the optimized radiation pattern is similar to the pattern (ii) of FIG. 8. Since the amplitude of the third even mode in this example is negligible, the pattern (ii) is primarily produced by the first two even modes. In order to obtain the desired pattern the converter length must approximately produce, between these two modes, a phase shift of substantially 90°.

Figure 14:
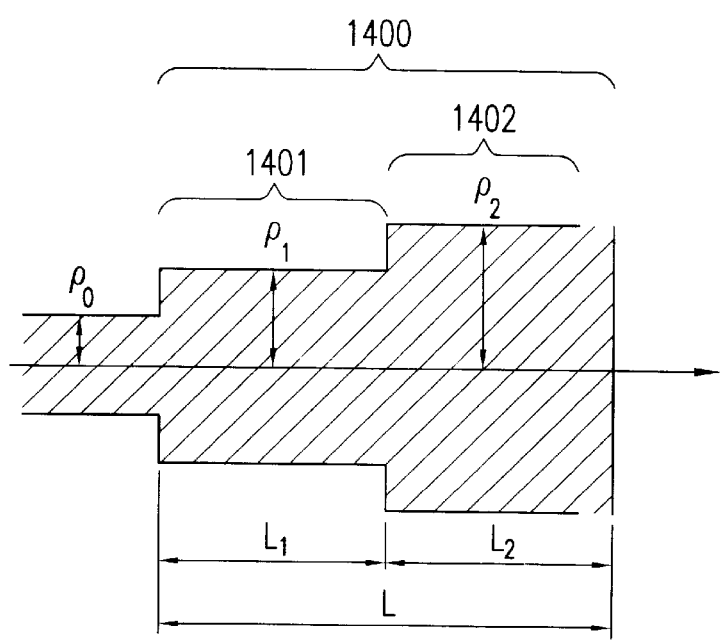
FIG. 14 is a schematic of a mode converter having two sections of lengths L1 and L2.
Figure 13:
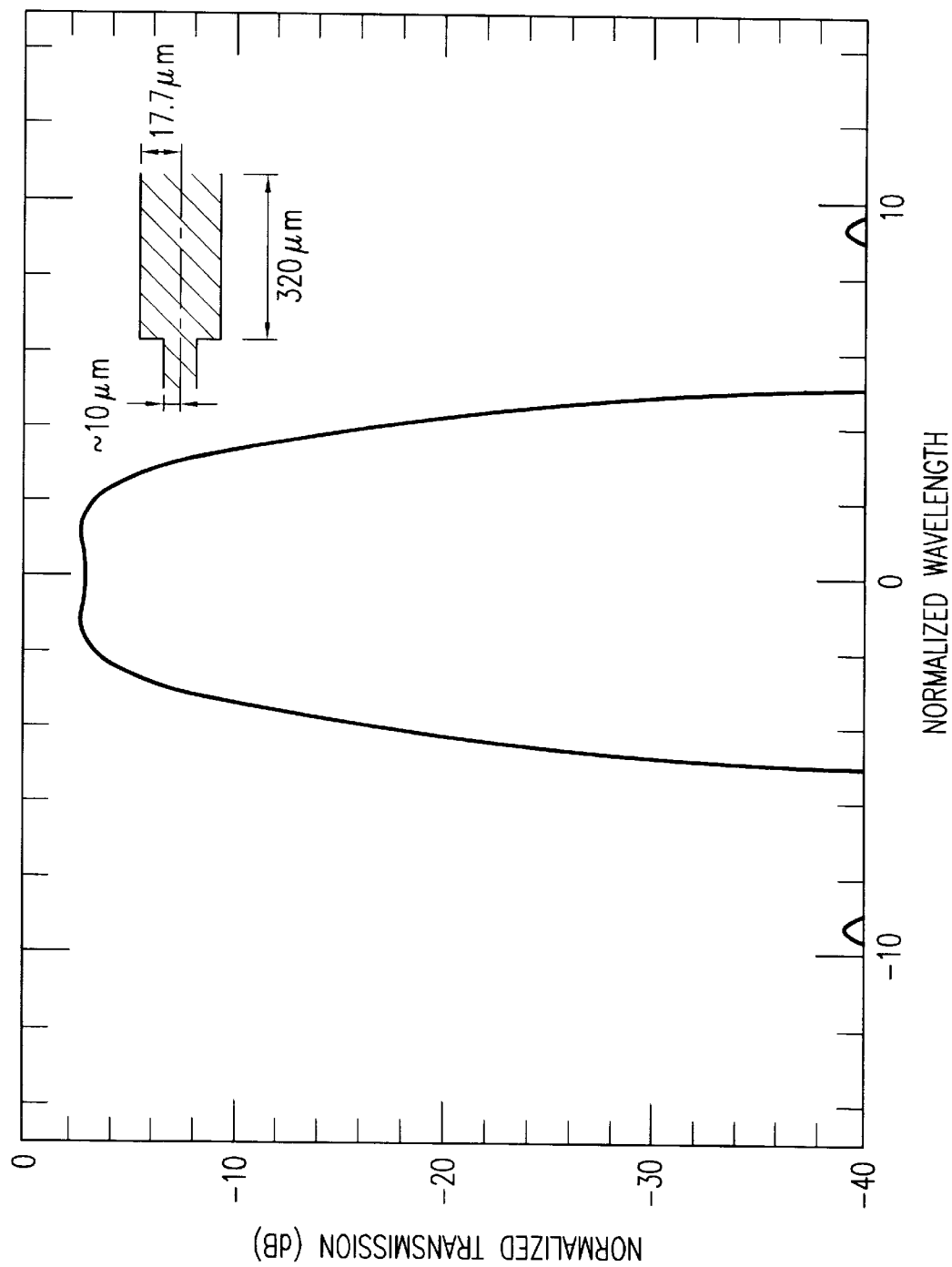
FIG. 13 is a graph of the transmission coefficient produced by the mode converter of FIG. 12.

Notice that the input discontinuity of FIG. 12 also excites the third mode. Therefore, it may be advantageous to reduce this third mode in a manner shown in FIG. 14. With reference now to FIG. 14, shown therein is a mode converter 1400 having at least two sections 1401 and 1402 each characterized by lengths L and $L_1$ and widths $\rho_1$; and $\rho_2$, respectively. By appropriately choosing the length and width of the sections, the mode in question can be substantially reduced, without substantially affecting the relative amplitudes of the other modes. Advantageously, a similar result may be obtained by using, a single section exhibiting a curved boundary, as in FIG. 9.

So far we only considered the radiated power. Also important, however, is the phase, for it determines the aperture phase distribution in the arms of the router. This distribution is the product of three distributions, respectively produced by the input waveguide radiation pattern, by the output waveguide radiation pattern (this can be verified by reciprocity) and the lengths of the arms. In the special case of a symmetric arrangement, the input and output waveguide radiate identical phase distributions, and their product differs, in general, from the phase distribution $\Phi=0, \pi$ of FIG. 10, required to produce the response of FIG. 1. Thus, in order to produce $\Phi=0, \pi$ the lengths of the arms must be properly chosen taking into account this difference.

As noted previously, the central region of the distribution (i) of FIG. 8 is primarily determined in FIG. 9 by the first two modes. Therefore the mode converter design can be modified in a variety of different ways, without greatly affecting its performance, provided the appropriate amplitudes are produced for the above two modes. For instance, one may change the converter profile determined by the upper and lower edges of the multimoding waveguide, or one may improve its performance by including inside the converter a radiating slot. Alternatively, one may use, in place of a multimoding waveguide, a combination of two or more waveguides as shown in FIG. 15.

While I have so far described only symmetric arrangements (input and output), my invention is not so limited. An important consideration is that the input and output arrangements produce similar envelopes, in each far-field pattern. Otherwise, they can differ from each other thereby producing an asymmetric arrangement.

One possibility is to entirely remove the loss in the arms, by properly modifying one of the two arrangements so as to produce essentially two zeroes in the aperture distribution, as required by curve (i) of FIG. 8. This will remove about half of the above loss. The remaining half will now be caused by the mismatch produced by the different distributions produced by the two arrangements. Such arrangements provide improved efficiency while eliminating, or at least reducing, the perturbations to some of the arms described previously.

Notice that it is difficult to exactly produce the specified aperture coefficients without some loss. Nevertheless, this can be done as follows without need to use leaky arms.

Figure 17:
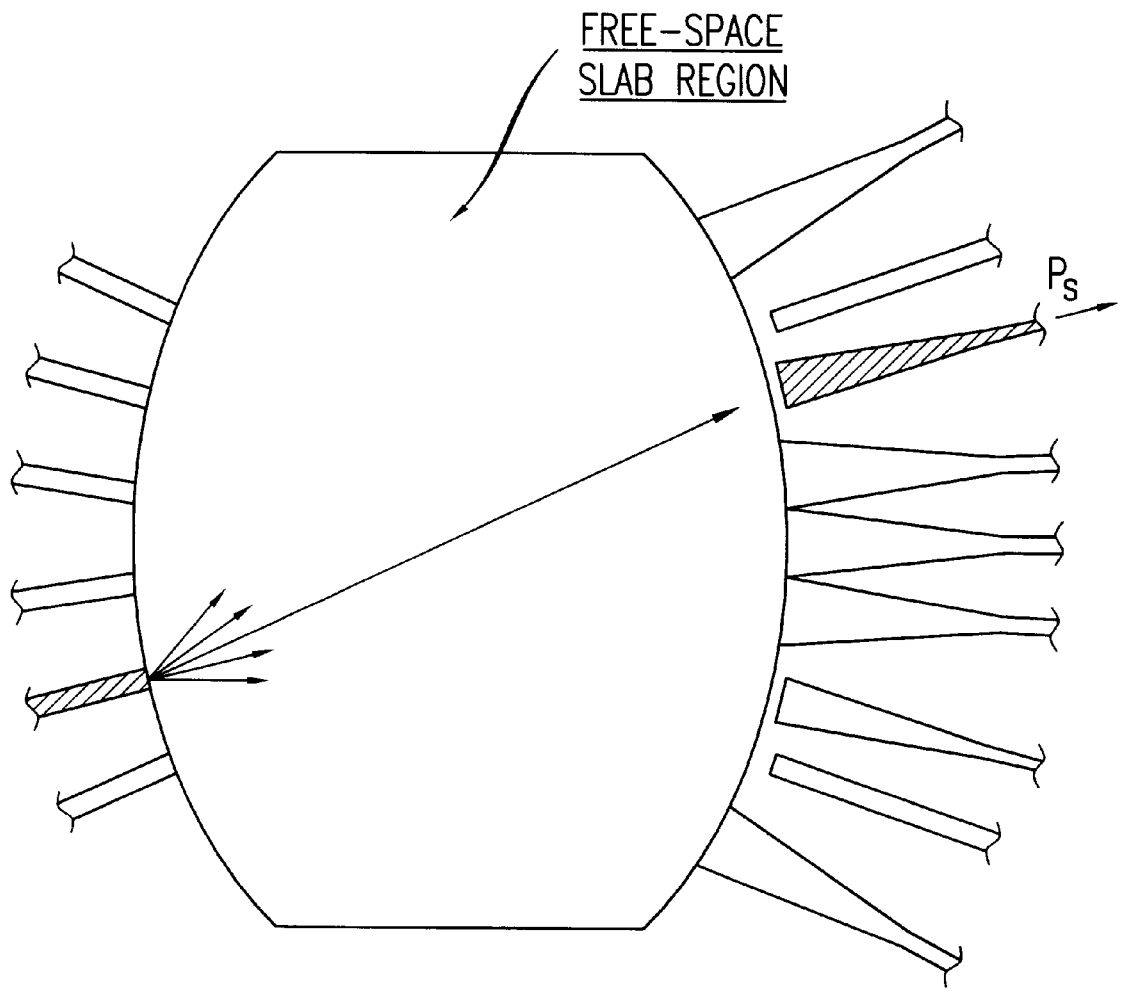
FIG. 17 is a schematic of a star coupler in which some of the receiving apertures have been modified to reduce the power in some of the arms of the grating according to the invention.

Recall that each arm is composed of a waveguide of suitable length connected between two apertures, as shown schematically in FIG. 16. One aperture receives the field radiated by the input waveguide and, the other, transmits the received signal to the output waveguide. The arm coefficient depends on the (receiving and transmitting) efficiencies of these two apertures. In a conventional router, the arms are connected to two periodic arrays of identical apertures and, therefore, all apertures have the same width, as generally shown in FIG. 16. In order to reduce the amplitudes of some of the arms, so as to obtain curve (ii) FIG. 8, we may reduce the efficiencies of some of the apertures as illustrated in FIG. 17. Specifically, the aperture efficiency can be reduced by reducing the aperture width, or by inserting a suitable gap, or a combination of both. Advantageously, this technique can be applied to the receiving aperture, or the transmitting aperture, or both. By this technique, the need to include radiation loss in the arms is eliminated.

Various additional modifications of this invention will occur to those skilled in the art. In particular, different shapes and dimensions of the mode converters are contemplated, particularly where radiation of varying wavelengths is used. Nevertheless, all deviations from the specific teachings of this specification that basically rely upon the principles and their equivalents through which the art has been advanced are properly considered within the scope of the invention as described and claimed.

The invention claimed is:

1. A waveguide grating router comprising:
   a first optical coupling device having at least one input port and P output ports;
   a second optical coupling device having at least P input ports and at least one output port; and
   P optical paths coupling the output port of the first optical coupling device to the input ports of the second optical coupling device;
   CHARACTERIZED IN THAT
   the waveguide grating router includes:
   a first mode converter optically coupled to at least one input port and the P output ports of the first optical coupling device, said first mode converter having at least two even modes that determine a first set of coupling coefficients between the input port and the P output ports of the first optical coupling device; and
   a second mode converter optically coupled to at least one output port of the second optical coupling device, said second mode converter having at least two even modes that determine a second set of coupling coefficients between said output port and the P input ports of the second optical coupling device;
   wherein the two sets of coefficients produced by the first mode converter and the second mode converter are essentially matched in magnitude such that a specified behaviour for the transmission coefficient in the vicinity of a center wavelength is produced with an acceptable mismatch loss.

2. The waveguide grating router of claim 1 further:
   CHARACTERIZED IN THAT
   the optical paths have a suitable loss introduced in selected ones of the optical paths such that the transmission coefficient is improved.

3. The waveguide grating router of claim 1 further:
   CHARACTERIZED IN THAT
   the optical paths have lengths such that each path contributes with an appropriate phase to the transmission coefficient and some of the paths contribute in-phase and other paths contribute out-of-phase in the vicinity of the center wavelength.

4. The waveguide grating router of claim 1 further:
   CHARACTERIZED IN THAT
   one of the mode converters is selectively modified so as to reduce the coupling coefficients in some of the optical paths such that a loss that would otherwise be required in these paths to improve the transmission coefficient, is reduced.

* * * * *